United States Patent
Ungar

(10) Patent No.: US 6,282,702 B1
(45) Date of Patent: Aug. 28, 2001

(54) METHOD AND APPARATUS OF TRANSLATING AND EXECUTING NATIVE CODE IN A VIRTUAL MACHINE ENVIRONMENT

(75) Inventor: David Ungar, Palo Alto, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/134,073

(22) Filed: Aug. 13, 1998

(51) Int. Cl.[7] .................................................. G06F 9/45
(52) U.S. Cl. ................................. 717/5; 717/4; 717/7
(58) Field of Search .......................... 395/705, 704, 395/709, 500.41; 707/103; 709/1; 711/170; 717/5, 4, 9, 7, 1, 2, 3

(56) References Cited

U.S. PATENT DOCUMENTS

| | | | |
|---|---|---|---|
| 5,339,422 | * 8/1994 | Brender et al. ........................... 714/4 |
| 5,428,786 | * 6/1995 | Sites ........................................ 717/9 |
| 5,561,785 | * 10/1996 | Blandy et al. ....................... 711/170 |
| 5,761,477 | * 6/1998 | Wahbe et al. ............................ 709/1 |
| 5,764,947 | * 6/1998 | Murphy et al. ........................ 703/20 |
| 5,805,895 | * 9/1998 | Breternitz, Jr. et al. ................. 717/9 |
| 5,875,336 | * 2/1999 | Dickol et al. ............................. 717/5 |
| 5,923,878 | * 9/1998 | Marsland ................................. 717/4 |
| 5,937,187 | * 10/1999 | Kosche et al. ........................ 709/104 |
| 5,946,487 | * 8/1999 | Dangelo .................................. 717/5 |
| 5,974,256 | * 10/1999 | Matthews et al. ........................ 717/5 |
| 6,052,707 | * 4/2000 | D'Souza ............................... 709/106 |

FOREIGN PATENT DOCUMENTS

| | | | |
|---|---|---|---|
| 0372835 | 6/1990 | (EP) .................................. G06F/9/45 |
| 0644484 | 3/1995 | (EP) .................................. G06F/9/46 |
| 9712508 | 4/1997 | (WO). |
| 9731309 | 8/1997 | (WO) .............................. G06F/9/318 |

OTHER PUBLICATIONS

Java Native Interface Specification; May 16, 1997; XP–002129468.

* cited by examiner

Primary Examiner—Mark R. Powell
Assistant Examiner—Hoang-Vu Antony Nguyen-Ba
(74) Attorney, Agent, or Firm—The Hecker Law Group

(57) ABSTRACT

A method and apparatus of translating and executing native code in a virtual machine environment. Debugging of a virtual machine implementation is made easier through binary translation of native code, which permits greater platform independence and greater control over thread management and scheduling, and provides for identification of memory access errors in the native code. When native code is to be executed within a virtual machine environment, the native code is translated into an intermediate form. This intermediate form is processed to determine where memory access and blocking system calls occur. Validity checks are inserted into memory access calls to determine whether the portion of memory to be accessed by each call is within a permitted range. Wild pointers and other resources of memory access errors associated with the native code may thus be identified. Blocking system calls are replaced with non-blocking variants, and "yield" operations may be inserted into system calls and loops. The revised native code incorporating memory access validity checks and non-blocking system calls is compiled or interpreted by the virtual machine to execute the routines defined by the native code. Because the revised native code does not block other threads, thread scheduling may be managed by the virtual machine rather than the underlying operating system, and cooperative scheduling may be performed.

26 Claims, 8 Drawing Sheets

| LEGEND: FIGURES 6A-6B |
|---|
| RD = memory read operation |
| WR = memory write operation |
| BR = branch operation (e.g., "if") |
| MC = method (function) call |
| BSC = blocking system call |
| OP = other general operation (miscellaneous) |
| CHK = pointer check operation |
| YLD = yield operation |
| NBSC = non-blocking system call |
| FLAG = signal access violation |

METHOD AND APPARATUS OF TRANSLATING AND EXECUTING NATIVE CODE IN A VIRTUAL MACHINE ENVIRONMENT

BACKGROUND OF THE INVENTION

1. Field of the Invention

This invention relates to the field of computer systems, and, more specifically, to virtual machine runtime environments.

Solaris, Sun, Sun Microsystems, the Sun logo, Java and all Java-based trademarks and logos are trademarks or registered trademarks of Sun Microsystems, Inc. in the United States and other countries.

2. Background Art

The Java™ programming language, developed by Sun Microsystems®, has an advantage over other programming languages of being a "write once, run anywhere"™ language. The Java programming language provides a substantially platform-independent mechanism for applications, or "applets," to be designed, distributed and executed in the form of bytecode class files. The Java virtual machine handles the resolution of the bytecodes into the requisite platform dependent instruction set, so that all computing platforms which contain a Java virtual machine are capable of executing the same bytecode class files. When functions are needed which are not supported by the Java programming language, a Java application executing within the virtual machine may invoke native code functions implemented in linked libraries. Native code is not subject to Java programming and execution restrictions, thus providing more platform-specific programmability at the cost of less well-controlled execution behavior. A processing environment for Java applications and applets, and the use of native code, are described more fully below.

The Processing Environment

The Java programming language is an object-oriented programming language with each program comprising one or more object classes and interfaces. Unlike many programming languages in which a program is compiled into machine-dependent, executable program code, classes written in the Java programming language are compiled into machine independent bytecode class files. Each class contains code and data in a platform-independent format called the class file format. The computer system acting as the execution vehicle contains a program called a virtual machine, which is responsible for executing the code in each class.

Applications may be designed as standalone Java applications, or as Java "applets" which are identified by an applet tag in an HTML (hypertext markup language) document, and loaded by a browser application. The class files associated with an application or applet may be stored on the local computing system, or on a server accessible over a network. Each class is loaded into the Java virtual machine, as needed, by the "class loader."

To provide a client with access to class files from a server on a network, a web server application is executed on the server to respond to HTTP (hypertext transport protocol) requests containing URLs (universal resource locators) to HTML documents, also referred to as "web pages." When a browser application executing on a client platform receives an HTML document (e.g., as a result of requesting an HTML document by forwarding a URL to the web server), the browser application parses the HTML and automatically initiates the download of the specified bytecode class files when it encounters an applet tag in the HTML document.

The classes of a Java applet are loaded on demand from the network (stored on a server), or from a local file system, when first referenced during the Java applet's execution. The virtual machine locates and loads each class file, parses the class file format, allocates memory for the class's various components, and links the class with other already loaded classes. This process makes the code in the class readily executable by the virtual machine.

Java applications and applets often make use of class libraries. Classes in the class libraries may contain what are referred to as "native methods." Applications and applets may occasionally contain classes that have native methods as well. A native method specifies the keyword "native," the name of the method, the return type of the method, and any parameters that are passed to the method. In contrast to a "standard method" (i.e., non-native method) written in the Java programming language, there is no body to a native method within the respective class. Rather, the routines of a native method are carried out by compiled native code (e.g., code written in the C or C++ programming language and compiled into binary form) that is dynamically linked to a given class in the virtual machine at runtime using a linking facility specific to the given platform which supports linked libraries.

In the Solaris™ or UNIX environment, for example, the linked library containing the binary form of the native code may be implemented as a "shared object" library written as a ".so" file. In a Windows environment, the linked library may take the form of a dynamic linked (or dynamic loadable) library written as a ".dll" file. Native code may be used to perform functions otherwise not supported by the Java programming language, such as interfacing with specialized hardware (e.g., display hardware) or software (e.g., database drivers) of a given platform. Native code may also be used to speed up computationally intensive functions, such as rendering.

A class that contains a native method also contains a call to load the respective linked library:

System.loadLibrary("Sample");

where "Sample" is the name of the linked library, typically stored in a file named "libSample.so" or "Sample.dll", depending on the host operating system (e.g., UNIX, Windows, etc.). The linked library is typically loaded at the time the associated class is instantiated within the virtual machine.

The linked library of native code is compiled with stub and header information of the associated class to enable the linked library to recognize the method signature of the native method in the class. The implementation of the native method is then provided as a native code function (such as a C function) in the linked library. At runtime, when a call is made to the native method, control is passed to the function in the linked library that corresponds to the called method (e.g., via pushing of a native method frame onto the native method stack). The native code within the linked library performs the function and passes control back to the Java application or applet.

FIG. 1 illustrates the compile and runtime environments for a processing system. In the compile environment, a software developer creates source files 100 (e.g., in the Java programming language), which contain the programmer readable class definitions, including data structures, method implementations and references to other classes. Source files 100 are provided to Java compiler 101, which compiles source files 100 into compiled ".class" files 102 that contain bytecodes executable by a Java virtual machine. Bytecode class files 102 are stored (e.g., in temporary or permanent storage) on a server, and are available for download over a network. Alternatively, bytecode class files 102 may be stored locally in a directory on the client platform.

The Java runtime environment contains a Java virtual machine (JVM) 105 which is able to execute bytecode class files and execute native operating system ("O/S") calls to operating system 109 when necessary during execution. Java virtual machine 105 provides a level of abstraction between the machine independence of the bytecode classes and the machine-dependent instruction set of the underlying computer hardware 110, as well as the platform-dependent calls of operating system 109.

Class loader and bytecode verifier ("class loader") 103 is responsible for loading bytecode class files 102 and supporting class libraries 104 into Java virtual machine 105 as needed. Class loader 103 also verifies the bytecodes of each class file to maintain proper execution and enforcement of security rules. Within the context of runtime system 108, either an interpreter 106 executes the bytecodes directly, or a "just-in-time" (JIT) compiler 107 transforms the bytecodes into machine code, so that they can be executed by the processor (or processors) in hardware 110. Native code, e.g., in the form of a linked library 111, is loaded when a class (e.g., from class libraries 104) containing the associated native method is instantiated within the virtual machine.

The runtime system 108 of virtual machine 105 supports a general stack architecture. The manner in which this general stack architecture is supported by the underlying hardware 110 is determined by the particular virtual machine implementation, and reflected in the way the bytecodes are interpreted or JIT-compiled. Other elements of the runtime system include thread management (e.g., scheduling) and garbage collection mechanisms.

FIG. 2 illustrates runtime data areas which support the stack architecture within runtime system 108. In FIG. 2, runtime data areas 200 comprise one or more thread-based data areas 207. Each thread-based data area 207 comprises a program counter register (PC REG) 208, a local variables pointer register (VARS REG) 209, a frame register (FRAME REG) 210, an operand stack pointer register (OPTOP REG) 211, a stack 212 (e.g., for standard methods) and, optionally, a native method stack 216. Stack 212 comprises one or more frames 213 which contain an operand stack 214 and local variables 215. Native method stack 216 comprises one or more native method frames 217.

Runtime data areas 200 further comprises shared heap 201. Heap 201 is the runtime data area from which memory for all class instances and arrays is allocated. Shared heap 201 comprises method area 202, which is shared among all threads. Method area 202 comprises one or more class-based data areas 203 for storing information extracted from each loaded class file. For example, class-based data area 203 may comprise class structures such as constant pool 204, field and method data 205, and code for methods and constructors 206.

A virtual machine can support many threads of execution at once. Each thread has its own thread-based data area 207. At any point, each thread is executing the code of a single method, the "current method" for that thread. If the "current method" is not a native method, program counter register 208 contains the address of the virtual machine instruction currently being executed. If the "current method" is a native method, the value of program counter register 208 is undefined. Frame register 210 points to the location of the current method in method area 202.

Each thread has a private stack 212, created at the same time as the thread. Stack 212 stores one or more frames 213 associated with standard methods invoked by the thread. Frames 213 are used to store data and partial results, as well as to perform dynamic linking, return values for methods and dispatch exceptions. A new frame is created and pushed onto the stack each time a standard method is invoked, and an existing frame is popped from the stack and destroyed when its method completes. A frame that is created by a thread is local to that thread and typically cannot be directly referenced by any other thread.

Only one frame, the frame for the currently executing method, is active at any point in a given thread of control. This frame is referred to as the "current frame," and its method is known as the "current method." A frame ceases to be current if its method invokes another method or if its method completes. When a method is invoked, a new frame is created and becomes current when control transfers to the new method. On method return, the current frame passes back the results of its method invocation, if any, to the previous frame. The current frame is then discarded while the previous frame becomes the current one.

Each frame 213 has its own set of local variables 215 and its own operand stack 214. The local variables pointer register 209 contains a pointer to the base of an array of words containing local variables 215 of the current frame. The operand stack pointer register 211 points to the top of operand stack 214 of the current frame. Most virtual machine instructions take values from the operand stack of the current frame, operate on them, and return results to the same operand stack. Operand stack 214 is also used to pass arguments to methods and receive method results.

Native method stack 216 stores native method frames 217 in support of native methods. Each native method frame provides a mechanism for thread execution control, method arguments and method results to be passed between standard methods and native methods implemented as native code functions in a linked library.

Because native methods are implemented by native code within a linked library rather than as a standard method in a class, native methods are not subject to the restrictions imposed by the Java programming language and the bytecode verifier. This means that, unlike bytecodes for compiled Java applications and applets, native code in a linked library may be prone to undesired and illegal behavior that proceeds unchecked at runtime. For example, memory access errors may take place in the native code due to the occurrence of "wild" pointers (e.g., a pointer whose value exceeds a proscribed range, such as a pointer to the ninth element of an eight element array) and the use of memory access mechanisms that may address inappropriate (i.e., restricted or out-of-bounds) memory locations. The use of native methods therefore makes possible a range of programming bugs, mostly based on the use of pointers, that make debugging a particular virtual machine implementation more difficult.

Further, the native code may include blocking system calls (e.g., calls that may wait an unspecified length of time for an external event to occur). If a virtual machine implements its own thread management and scheduling, a blocking system call occurring when control has been passed to a native code function in a linked library can block the execution of the entire virtual machine.

Most virtual machine implementations avoid the blocking problems associated with native code by using "native threading." This means that multiple threads of the virtual machine and the program or programs (e.g, applications and/or applets) the virtual machine is executing are implemented as threads of the underlying platform, e.g., as UNIX threads. In this scheme, the threads of the virtual machine may execute concurrently. However, if native threading is used, the virtual machine must cede control over thread scheduling to the underlying operating system. Native threading thus causes thread behavior to be operating system and hardware-dependent. Effective debugging of concurrency-related bugs in a virtual machine implementation becomes problematic because, with native threading, the relative timing of thread execution may vary across different operating systems and hardware platforms.

FIGS. 3A and 3B are block diagrams that illustrate thread use in runtime environments. FIG. 3A contains a virtual machine that does not use native threading. FIG. 3B contains a virtual machine that does use native threading.

In FIG. 3A, operating system 109 runs on top of hardware 110, and virtual machine 105 runs on top of operating system 109. Executing within virtual machine 105 are multiple applications and/or applets, such as applet1 (300) and applet2 (301). Applet1 and applet2 may each comprise one or more bytecode class files. A linked library (LIB) 302 is associated with applet2 to support native methods. Library 302 is loaded and linked at the time the class of applet2 that contains the associated native methods is instantiated within virtual machine 105. The native code of library 302 runs directly on top of operating system 109, which supports the library linking facility, and hardware 110.

Multiple threads of execution are handled within virtual machine 105. For example, applet1 may have two threads, T1 and T2; applet2 may have two threads, T5 and T6; and the virtual machine itself may have two threads, T3 and T4, that carry out processes of the virtual machine, such as garbage collection. Threads T1–T6 are managed and scheduled by VM thread scheduler 303 within virtual machine 105. VM thread scheduler 303 selects, based on priorities and time-slicing methods for example, which thread of the group T1–T6 is to be the currently executing thread of the virtual machine, TVM, at the operating system level.

Java virtual machines typically support "cooperative scheduling" wherein executing threads yield processing resources to other threads at certain intervals, or when there is likely to be a delay associated with execution of the current thread. For example, a higher priority thread may take advantage of a yield operation to preempt the current thread. Yielding of processor resources need not be explicitly programmed in standard methods. The virtual machine may insert yields into the interpreting process or into the compiled code at suitable points in execution, such as at method calls and within loops (e.g., at backward branches), to implement cooperative scheduling.

Operating system 109 may serve many threads at any one time, including the selected virtual machine thread TVM. For example, operating system 109 may contain threads TA–TZ supporting other applications or other processes of the operating system. OS thread scheduler 304 determines which thread from the group TA–TZ and TVM is to be executed by the underlying hardware 110 at any given time. If hardware 110 supports multiple processors, multiple threads may be scheduled by OS thread scheduler 304 to execute simultaneously on different processors.

In the implementation of FIG. 3A, a virtual machine thread (e.g., T1–T6) may transfer execution control to a linked library (e.g., LIB 302) to perform a function for a native method, e.g., thread T6 may invoke a native method of applet2 that is supported by native code in library 302, as shown. Thread T6 is able to pass control over to library 302 because thread T6 is currently being passed through to operating system 109 as virtual machine thread TVM. Other threads of the virtual machine must wait for thread T6 to yield in accordance with cooperative scheduling.

However, the transfer of control to library 302 can give rise to virtual machine execution problems. Classes executing in the virtual machine typically call only methods of other classes, and do not, as a rule, make calls directly to the system. Native code, however, depending on its function, can make frequent system calls that block. Because the native code is executed independently as compiled code in a linked library, the virtual machine interpreter and compiler are bypassed, and cannot enforce cooperative scheduling until control is returned to a standard method. The virtual machine must therefore rely on the native code programmer to provide explicit yield() calls in the native code.

If the native code of library 302 makes a blocking system call, such as an I/O call to download a file, thread T6 within the virtual machine, and thus thread TVM at the operating system level, will block until the system call is completed, e.g., until the downloading is finished. The entire virtual machine execution, is also blocked for the duration of the system call as execution control is maintained by the native code of library 302. As blocking system calls may take a relatively long time to complete, it is undesirable for all threads of virtual machine 109 to be blocked as well. The performance of applet1, applet2 and virtual machine 105 may be diminished by blocking system calls of library 302. For this reason, many virtual machine implementations use native threading as shown in FIG. 3B.

In FIG. 3B, VM thread scheduler 303 implements multiple threads of the virtual machine as threads at the operating system level. These threads are labeled as threads TVM1–TVMn. VM thread scheduler 303 determines which virtual machine threads (T1–T6) are passed through to operating system 109 as OS threads TVM1–TVMn at any given time. In the extreme case where each thread of virtual machine 105 is implemented as an individual thread of the underlying operating system 109, virtual machine 105 may forego implementing VM thread scheduler 303, and may rely completely on OS thread scheduler 304 for thread scheduling.

The implementation of FIG. 3B permits multiple threads to be concurrently active in virtual machine 105. This means that a blocking system call by the native code of library 302 does not result in a complete block of virtual machine 105. Rather, one thread of the group TVM1–TVMn, the thread that passed control to library 302 (i.e., the operating system thread corresponding to virtual machine thread T6), is blocked, but the remainder of threads TVM1–TVMn are free to execute.

However, by implementing multiple threads of the virtual machine as OS or native threads, virtual machine 105 effectively cedes control over the scheduling of the threads in the virtual machine from VM thread scheduler 303 to OS thread scheduler 304. Synchronization errors may occur between threads of the virtual machine due to the relative lack of control exerted by the VM thread scheduler 303. To complicate matters, due to the reliance of native threading upon OS thread scheduler 304, synchronization errors may not occur, or may occur in a different manner, when virtual machine 105 and applet1 and applet2 are executed on a different operating system 109 and/or different hardware 110 having different timing parameters and scheduling processes. Thus, errors may not be easily repeatable, and debugging of the system is made more complicated.

Object-Oriented Programming

A general description of object-oriented programming principles is provided below for reference purposes. Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and zero or more arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. An example of a class-based object-oriented programming scheme is generally described in "Smalltalk-80: The Language," by Adele Goldberg and David Robson, published by Addison-Wesley Publishing Company, 1989.

A class defines a type of object that typically includes both fields (e.g., variables) and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_salary" method. Instances of the employee object class can be created, or instantiated, for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages, such as the Java programming language, support only single inheritance, where a subclass is limited to inheriting the class definition of only one parent class. The Java programming language also provides a mechanism known as an "interface" which comprises a set of constant and abstract method declarations. An object class can implement the abstract methods defined in an interface. Both single and multiple inheritance are available to an interface. That is, an interface can inherit an interface definition from more than one parent interface.

An object is a generic term that is used in the object-oriented programming environment to refer to a module that contains related code and variables. A software application can be written using an object-oriented programming language whereby the program's functionality is implemented using objects.

SUMMARY OF THE INVENTION

A method and apparatus of translating and executing native code in a virtual machine environment is provided to enable pointer checking, thread control, and other useful properties. Debugging of a virtual machine implementation is made easier through binary translation of native code, which permits greater platform independence and greater control over thread management and scheduling, and provides for identification of memory access errors in the native code. When native code is to be executed within a virtual machine environment, the native code is translated into an intermediate form. This intermediate form is processed to determine where memory access and blocking system calls occur. Validity checks are inserted into memory access calls to determine whether the portion of memory to be accessed by each call is within a permitted range. Wild pointers and other sources of memory access errors associated with the native code may thus be identified. Blocking system calls are replaced with non-blocking variants, and "yield" operations may be inserted into system calls and loops.

The revised native code incorporating memory access validity checks and non-blocking system calls is compiled or interpreted by the virtual machine to execute the routines defined by the native code. Because the revised native code does not block other threads, thread scheduling may be managed by the virtual machine rather than the underlying operating system, and cooperative scheduling may be performed.

DETAILED DESCRIPTION OF THE INVENTION

The invention is a method and apparatus of translating and executing native code in a virtual machine environment.

In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Though discussed herein with respect to the Java programming language and the Java virtual machine, the invention may be implemented in any virtual machine environment that includes native methods or functions.

Embodiment of Computer Execution Environment (Hardware)

Figure 4:
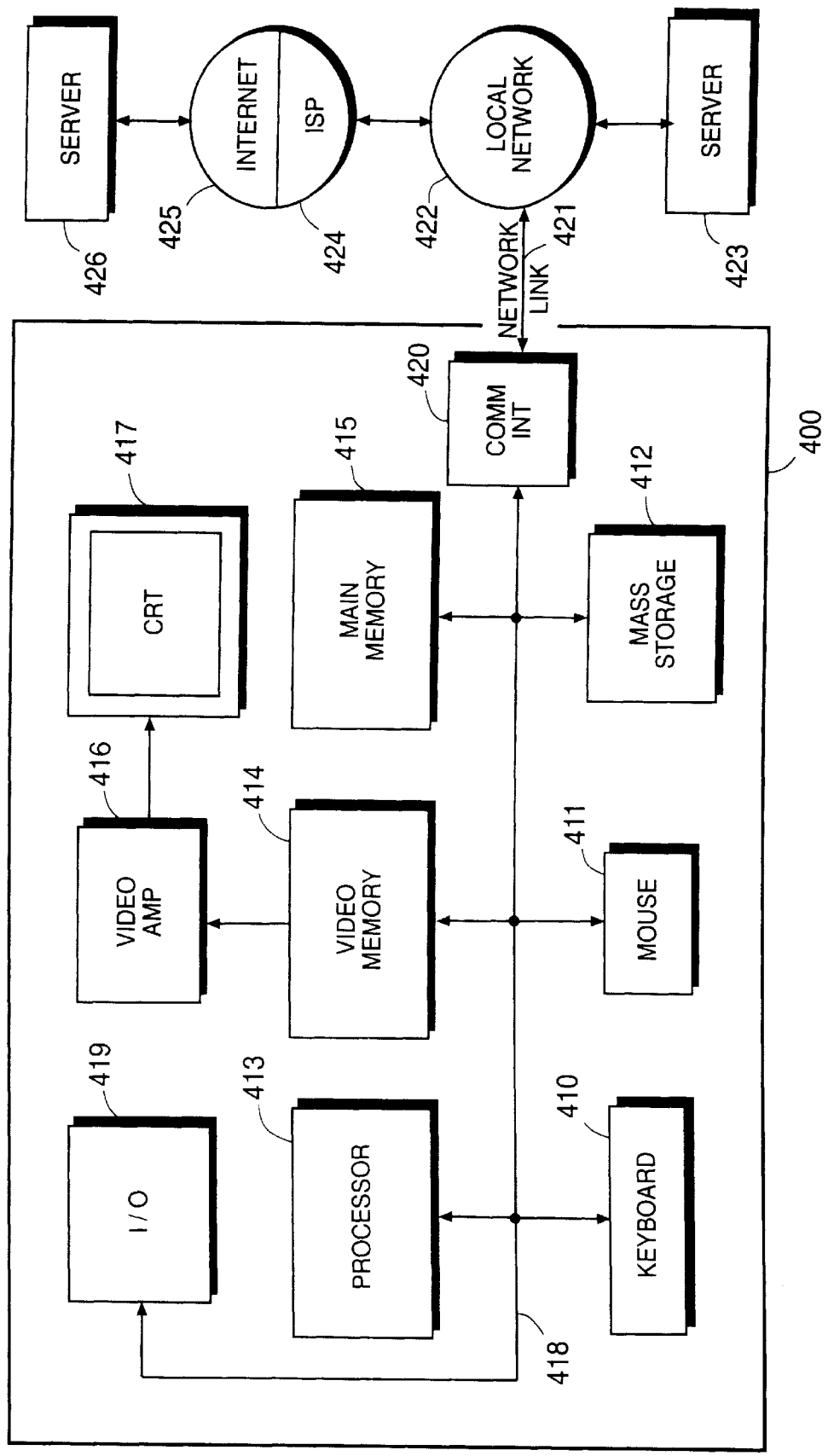
FIG. 4 is a block diagram of one embodiment of a computer system capable of providing a suitable execution environment for an embodiment of the invention.

An embodiment of the invention can be implemented as computer software in the form of computer readable code executed on a general purpose computer such as computer 400 illustrated in FIG. 4, or in the form of bytecode class files executable within a Java runtime environment running on such a computer. A keyboard 410 and mouse 411 are coupled to a bi-directional system bus 418. The keyboard and mouse are for introducing user input to the computer system and communicating that user input to processor 413. Other suitable input devices may be used in addition to, or in place of, the mouse 411 and keyboard 410. I/O (input/output) unit 419 coupled to bi-directional system bus 418 represents such I/O elements as a printer, A/V (audio/video) I/O, etc.

Computer 400 includes a video memory 414, main memory 415 and mass storage 412, all coupled to bi-directional system bus 418 along with keyboard 410, mouse 411 and processor 413. The mass storage 412 may include both fixed and removable media, such as magnetic, optical or magnetic optical storage systems or any other available mass storage technology. Bus 418 may contain, for example, address lines for addressing video memory 414 or main memory 415. The system bus 418 also includes, for example, a data bus for transferring data between and among the components, such as processor 413, main memory 415, video memory 414 and mass storage 412. Alternatively, multiplex data/address lines may be used instead of separate data and address lines.

In one embodiment of the invention, the processor 413 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 415 is comprised of dynamic random access memory (DRAM). Video memory 414 is a dual-ported video random access memory. One port of the video memory 414 is coupled to video amplifier 416. The video amplifier 416 is used to drive the cathode ray tube (CRT) raster monitor 417. Video amplifier 416 is well known in the art and may be implemented by any suitable apparatus. This circuitry converts pixel data stored in video memory 414 to a raster signal suitable for use by monitor 417. Monitor 417 is a type of monitor suitable for displaying graphic images. Alternatively, the video memory could be used to drive a flat panel or liquid crystal display (LCD), or any other suitable data presentation device.

Computer 400 may also include a communication interface 420 coupled to bus 418. Communication interface 420 provides a two-way data communication coupling via a network link 421 to a local network 422. For example, if communication interface 420 is an integrated services digital network (ISDN) card or a modem, communication interface 420 provides a data communication connection to the corresponding type of telephone line, which comprises part of network link 421. If communication interface 420 is a local area network (LAN) card, communication interface 420 provides a data communication connection via network link 421 to a compatible LAN. Communication interface 420 could also be a cable modem or wireless interface. In any such implementation, communication interface 420 sends and receives electrical, electromagnetic or optical signals which carry digital data streams representing various types of information.

Network link 421 typically provides data communication through one or more networks to other data devices. For example, network link 421 may provide a connection through local network 422 to local server computer 423 or to data equipment operated by an Internet Service Provider (ISP) 424. ISP 424 in turn provides data communication services through the world wide packet data communication network now commonly referred to as the "Internet" 425. Local network 422 and Internet 425 both use electrical, electromagnetic or optical signals which carry digital data streams. The signals through the various networks and the signals on network link 421 and through communication interface 420, which carry the digital data to and from computer 400, are exemplary forms of carrier waves transporting the information.

Computer 400 can send messages and receive data, including program code, through the network(s), network link 421, and communication interface 420. In the Internet example, remote server computer 426 might transmit a requested code for an application program through Internet 425, ISP 424, local network 422 and communication interface 420.

The received code may be executed by processor 413 as it is received, and/or stored in mass storage 412, or other non-volatile storage for later execution. In this manner, computer 400 may obtain application code in the form of a carrier wave. In accordance with an embodiment of the invention, examples of such downloaded applications include one or more elements of a runtime environment, such as the virtual machine, class loader, class bytecode files, class libraries and the apparatus for translating and executing native code described herein.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment, including embedded devices (e.g., web phones, etc.) and "thin" client processing environments (e.g., network computers (NC's), etc.) that support a virtual machine.

Binary Translation of Native Code

As described previously, classes executed within a virtual machine may include native methods that are implemented by native code functions within a linked library. In accordance with an embodiment of the invention, the native code of the linked library is processed and executed by components of the virtual machine to permit cooperative scheduling and to provide enhanced debugging capabilities over prior art native method execution processes. The processing of the native code includes, as part of a binary translation procedure, the insertion of checks for memory access bugs, such as might be caused by "wild" pointers, and the replacement of blocking system calls with non-blocking variants to permit cooperative scheduling in the virtual machine without the need for native threading.

Binary translation is typically enabled in the virtual machine during debugging operations, and disabled during normal operation. For example, when enabled, a "System.loadLibrary()" call results in binary translation of the specified library for interpreted or compiled execution within the virtual machine. When disabled, the specified library is loaded and linked in the standard manner. It is also possible, in some embodiments, for binary translation to be performed at all times, rather than only during debugging processes.

Figure 5:
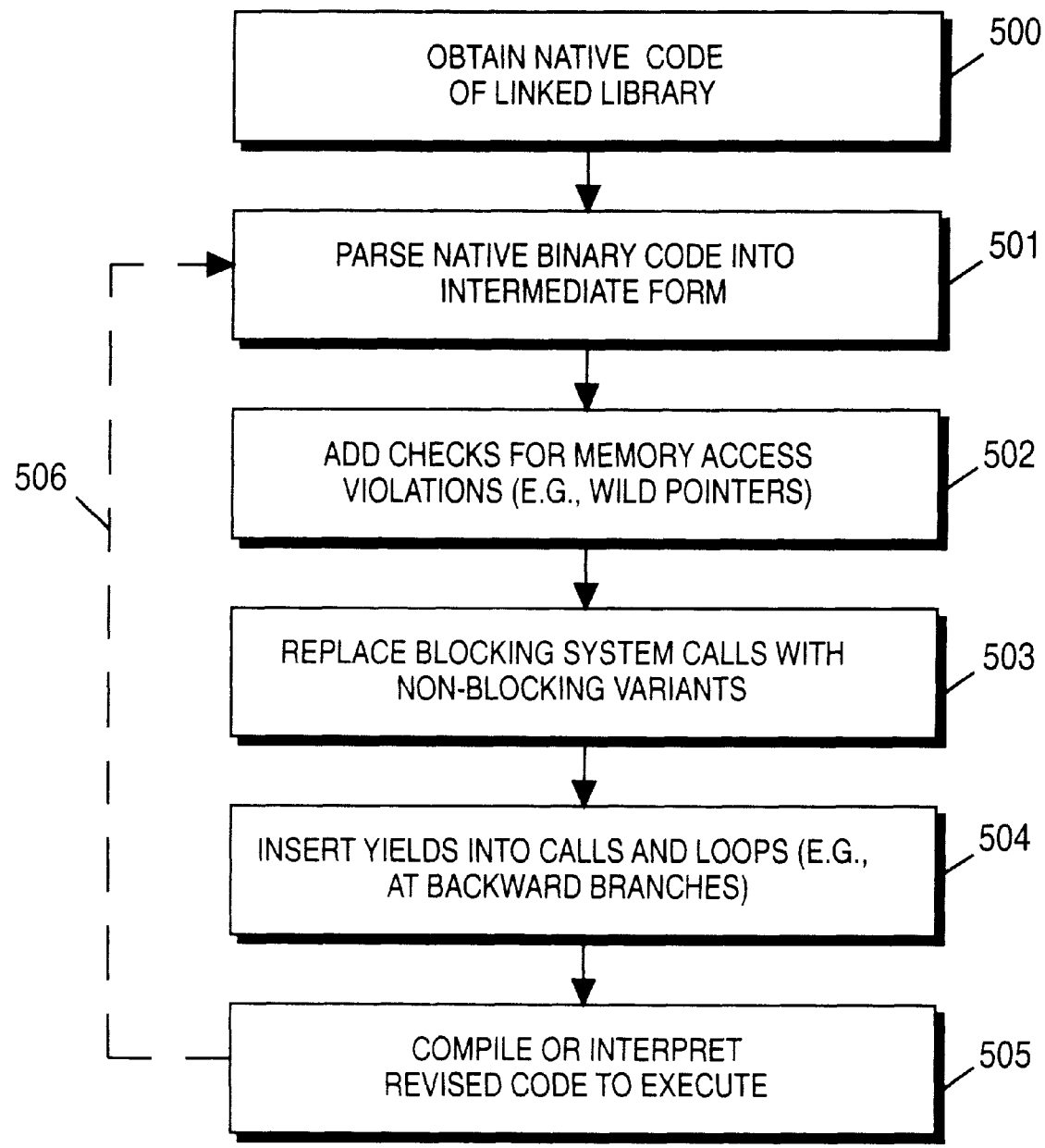
FIG. 5 is a flow diagram of a binary translation process in accordance with an embodiment of the invention.

FIG. 5 is a flow diagram of a method for performing binary translation in accordance with an embodiment of the invention. In step 500, the respective native code is obtained from the linked library. This step may comprise, for example, determining the source file of the linked library when the respective class is instantiated within the virtual machine, and reading the binary form of the native code (i.e., the machine code) from the source file. Binary translation may also be performed in advance of execution in the virtual machine.

Figure 1:
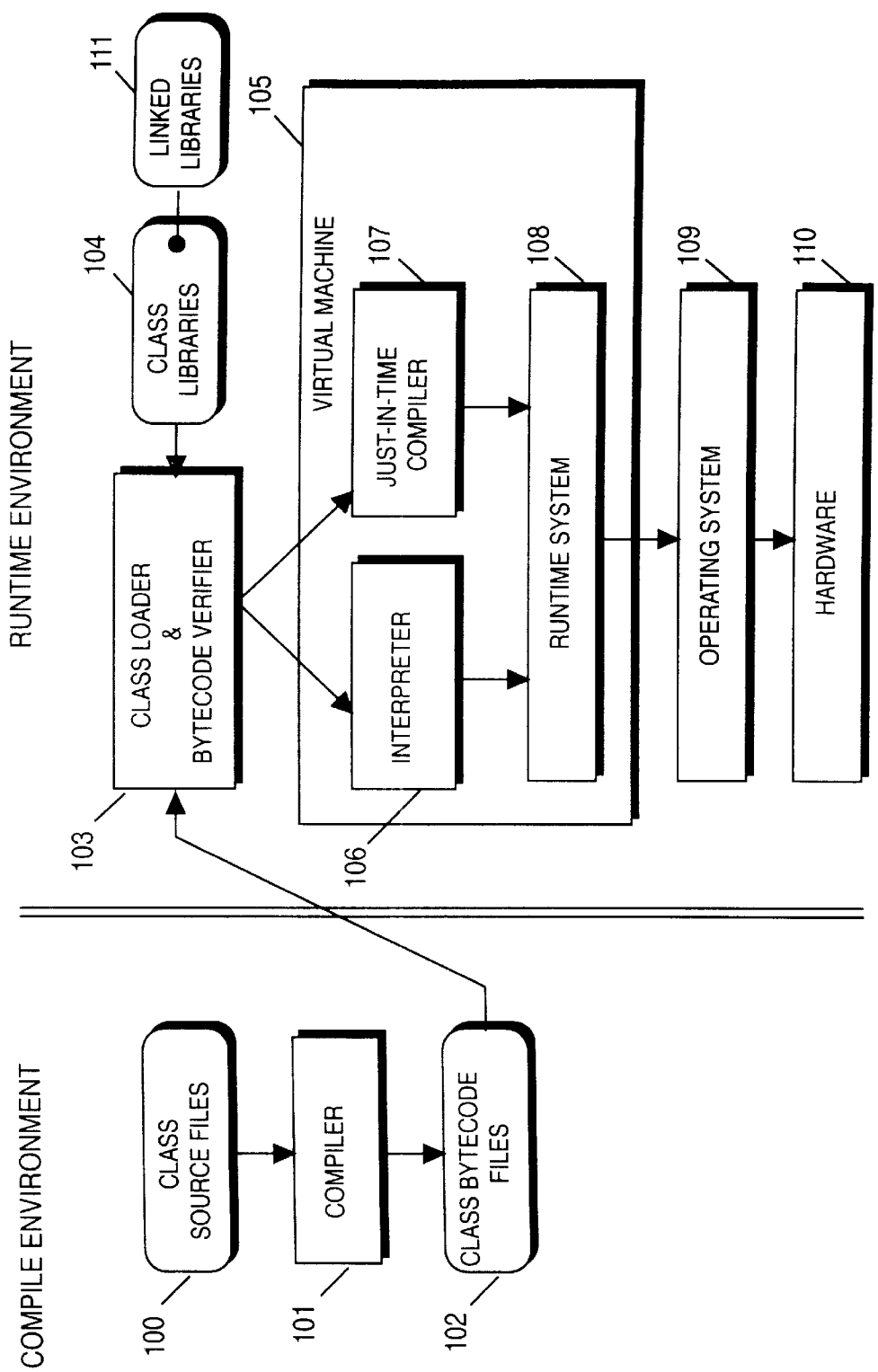
FIG. 1 is a block diagram of compile and runtime environments.
Figure 2:
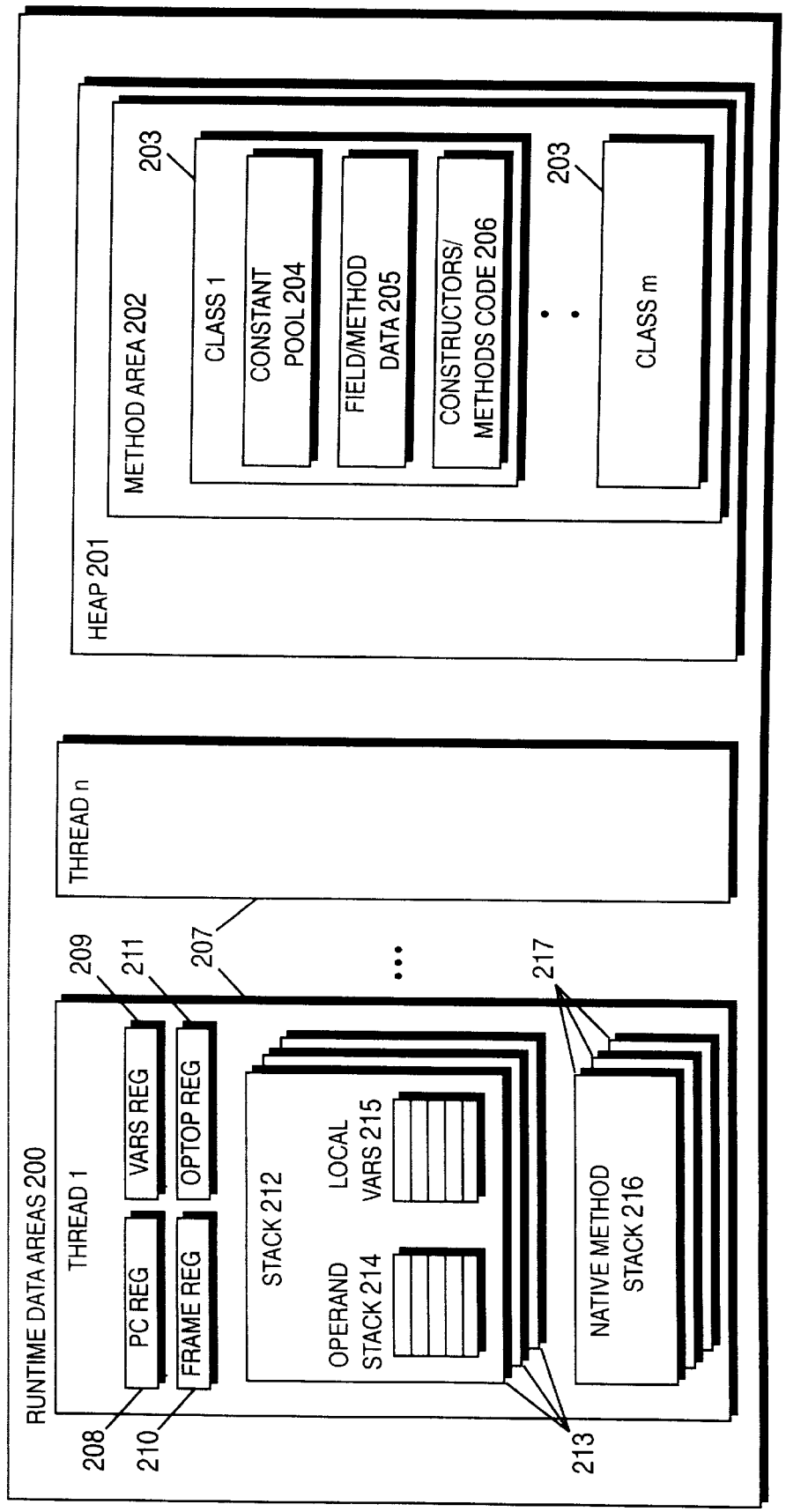
FIG. 2 is a block diagram of the runtime data areas of an embodiment of a virtual machine.

In step 501, the binary form of the native code is translated by a binary translation component of the virtual machine into an intermediate form, such as bytecodes, an abstract syntax tree or a control flow graph. Bytecodes may be implemented similarly to standard bytecodes produced, for example, by a Java compiler (element 101 of FIG. 1). Abstract syntax trees and control flow graphs are representations of program execution that specify execution operations as nodes of a tree or graph. Typically, the intermediate form (also herein referred to as the "translated form") is one which simplifies the identification of memory access points and/or calls and branching operations.

In step 502, the locations of memory access calls are determined, and checks are inserted to signal during execution if the memory access call attempts to access a portion of memory that is restricted or otherwise out-of-bounds. The signal may comprise, for example, displaying an error message (e.g., in a dialog box), logging an error to a log file, throwing an exception, or some combination of the preceding actions. Debugging of wild pointers and other memory access bugs associated with native code can therefore be determined during execution by reporting each illegal memory access event as it occurs. As part of the memory access checks, those portions of memory that are legally accessible by elements of the native code are tracked for comparison with pointer values.

At step 503, blocking system calls are identified in the intermediate form and, where possible, non-blocking variants of the system calls are inserted. In step 504, "yield()" functions are inserted into calls and loops. The yield points (i.e., the points for insertion of yield() functions) for loops may be determined, for example, based on backward branch operations. The effect of steps 503 and 504 is to free, as much as possible, the execution of the virtual machine and any running applications and/or applets from dependence on the activities of the native code. The other threads of the virtual machine are not blocked by system calls of the native code, and yield points are established at calls and within loops to yield processing resources to other waiting threads. The virtual machine is thus enabled to perform cooperative scheduling of all associated threads. This cooperative scheduling permits synchronization or concurrency-related bugs to be reliably identified and corrected independently of the underlying operating system and hardware.

In step 505, the revised native code in its intermediate or translated form is compiled or interpreted by the virtual machine to execute the functions therein. In some embodiments, a further translation step may be performed to translate the intermediate form into bytecodes suitable for interpretation or compilation by the standard interpreter and JIT-compiler. Scheduling of threads associated with the execution of the native code functions may be controlled by the VM thread scheduling process like any other interpreted or compiled process of the virtual machine. As the memory access checks are performed, violations are logged. Where necessary, separate asynchronous threads may be spawned to allow further processing to take place independently of the other threads in the virtual machine.

In some instances, the native code may not be completely parsed in step 501. Certain aspects of the code, such as the beginning of a routine or a computed branch, may not be known until the translated code is being executed in step 505 (e.g., when the routine is actually called). For this reason, the translation process may return to step 501 from step 505, as indicated by feedback arrow 506, for the purpose of parsing and translating previously unparsed native code (or reparsing portions of already parsed code) based on new information determined during execution.

Figures 6A, 6B:
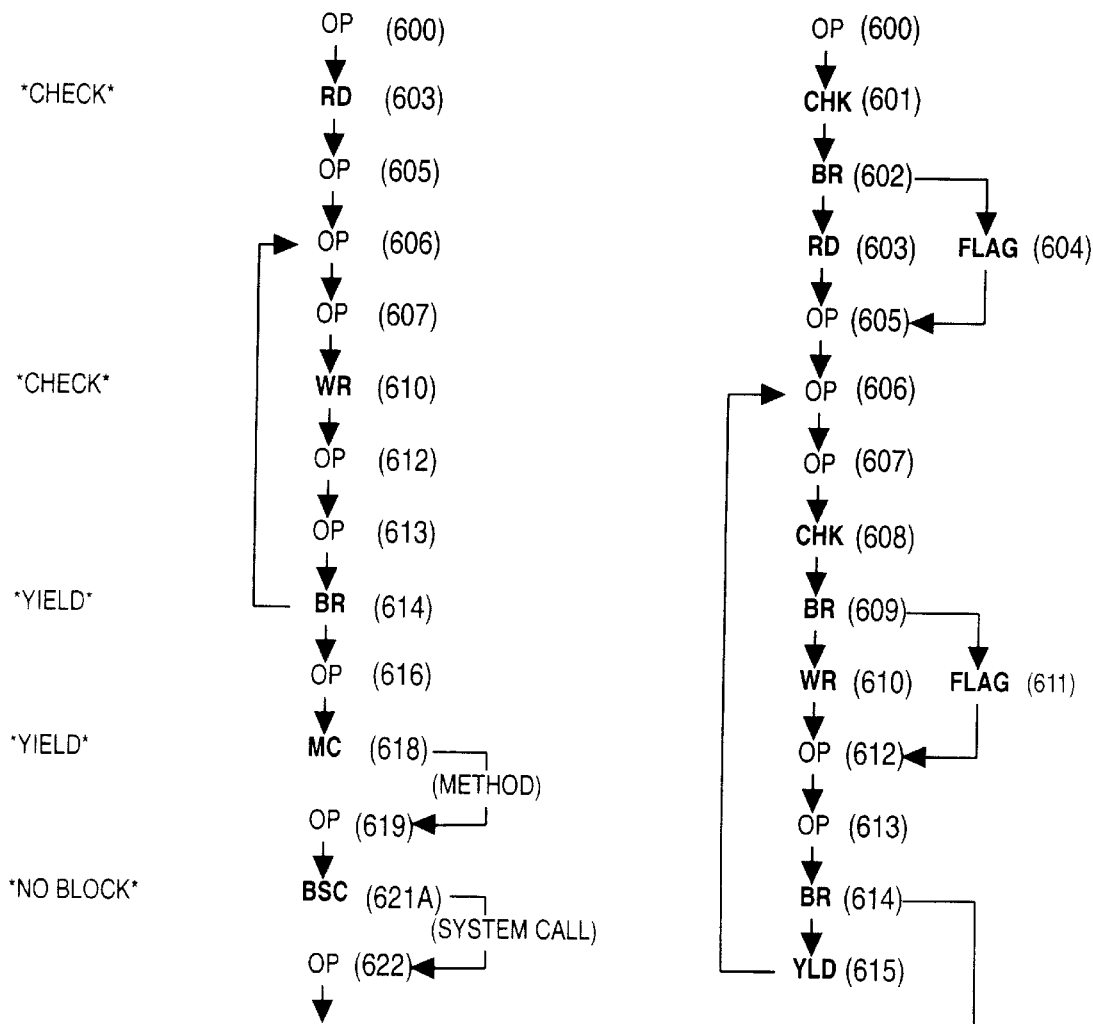
FIG. 6A is a generalized control flow diagram of an example execution block illustrating binary translation of a block of native code into an intermediate form in accordance with an embodiment of the invention.
FIG. 6B illustrates the generalized control flow diagram of FIG. 6A with modifications performed in accordance with an embodiment of the invention.

An example of a generalized intermediate form of a native method undergoing binary translation is illustrated in FIGS. 6A and 6B. FIG. 6A is a generalized control flow diagram of an example execution block illustrating binary translation of a block of native code into an intermediate form in accordance with an embodiment of the invention. FIG. 6B illustrates the generalized control flow diagram of FIG. 6A with modifications performed in accordance with an embodiment of the invention. In this embodiment, identification of yield points within loops is based on the occurrence of backward branch operations.

For identification of the illustrated operations, the legend for FIGS. 6A and 6B is as follows:

RD=memory read operation

WR=memory write operation

BR=branch operation (e.g., "if")

MC=method (function) call

BSC=blocking system call

OP=other general operation (miscellaneous)

CHK=pointer check operation

YLD=yield operation

NBSC=non-blocking system call

FLAG=signal access violation

In FIG. 6A, the execution block begins with a general operation 600, followed by a read operation 603. Read operation 603 is followed in succession by general operations 605, 606 and 607. After, general operation 607, a write operation 610 is performed, followed by general operations 612 and 613, and branch operation 614. Branch operation either moves forward to general operation 616, or branches backward to general operation 606. From general operation 616, method call 618 is made, followed by general operation 619, blocking system call 621A and general operation 622.

The operations of interest to the binary translation procedure are read operation 603, write operation 610, branch operation 614, method call 618, and blocking system call 621A, each of which is highlighted. Read operation 603 and write operation 610, as memory access-related operations, are set for insertion of pointer checks. Branch operation 614 and method call 618 are set for insertion of yield() calls. Blocking system call 621A is set for replacement by a non-blocking system call variant.

In FIG. 6B, the modifications to the intermediate form of the execution block of FIG. 6A are illustrated. Read operation 603 is replaced by pointer check operation 601, branch operation 602, read operation 603 and flag operation 604. Check operation 601 determines whether the pointer value is within legal range, and is followed by branch operation 602. Branch operation 602 either performs read operation 603, if the pointer is valid, or performs flag operation 604 to signal that the pointer check shows an invalid pointer. Operations 603 and 604 each proceed to operation 605.

Write operation 610 is subject to check and flag insertion similar to the insertion performed for read operation 603 described above. Write operation 610 is replaced by pointer check operation 608, branch operation 609, write operation 610 and flag operation 611. Check operation 608 determines whether the pointer value is within legal range, and is followed by branch operation 609. Branch operation 609 either performs write operation 610, if the pointer is valid, or performs flag operation 611 to signal that the pointer check shows an invalid pointer. Operations 610 and 611 each proceed to operation 612.

Backward branch operation 614 has a yield operation 615 inserted into the return loop to operation 606. The inserted yield operation (615) allows other threads the opportunity to obtain processor resources before the loop formed by branch operation 614 begins once more. This prevents a long loop recursion process from depriving other threads of processor resources, and promotes cooperative scheduling. Similarly, yield operation 617 is inserted prior to method call 618 to allow other threads to execute, if needed, before a new method is initiated by the current thread.

Blocking system call 621A is replaced in FIG. 6B by non-blocking system call 621B. Optionally, a yield operation (620) may be inserted prior to the system call. If needed, non-blocking system call 621B may spawn a new asynchronous thread to carry on activities of the translated function as an independently executed thread. When interpreted or compiled by the virtual machine, the revised execution block of FIG. 6B provides significant debugging and scheduling advantages over the native method execution of the prior art.

Figure 3A:
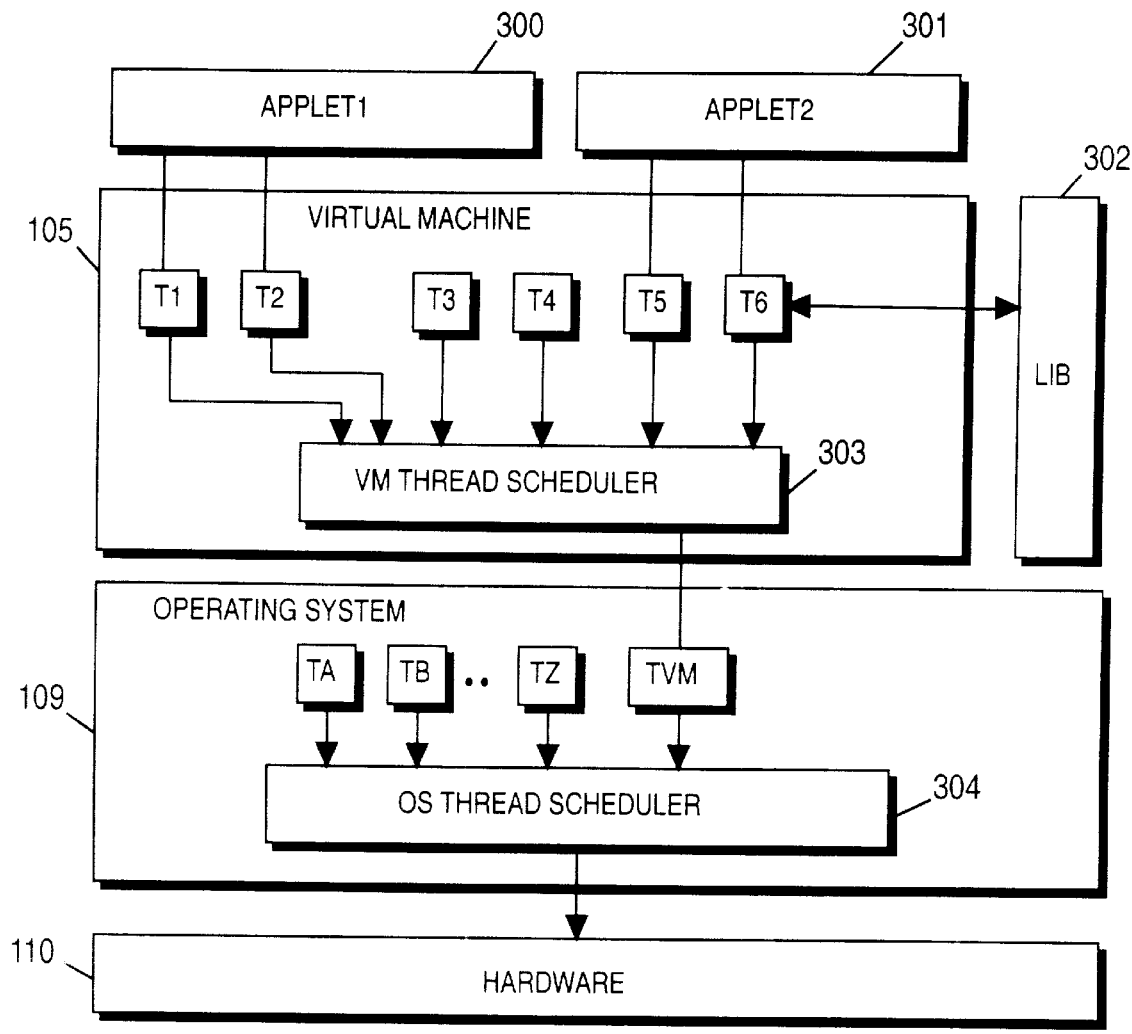
FIG. 3A is a block diagram of a runtime environment having a virtual machine supporting multiple applets and native code implemented via a linked library.
Figure 7:
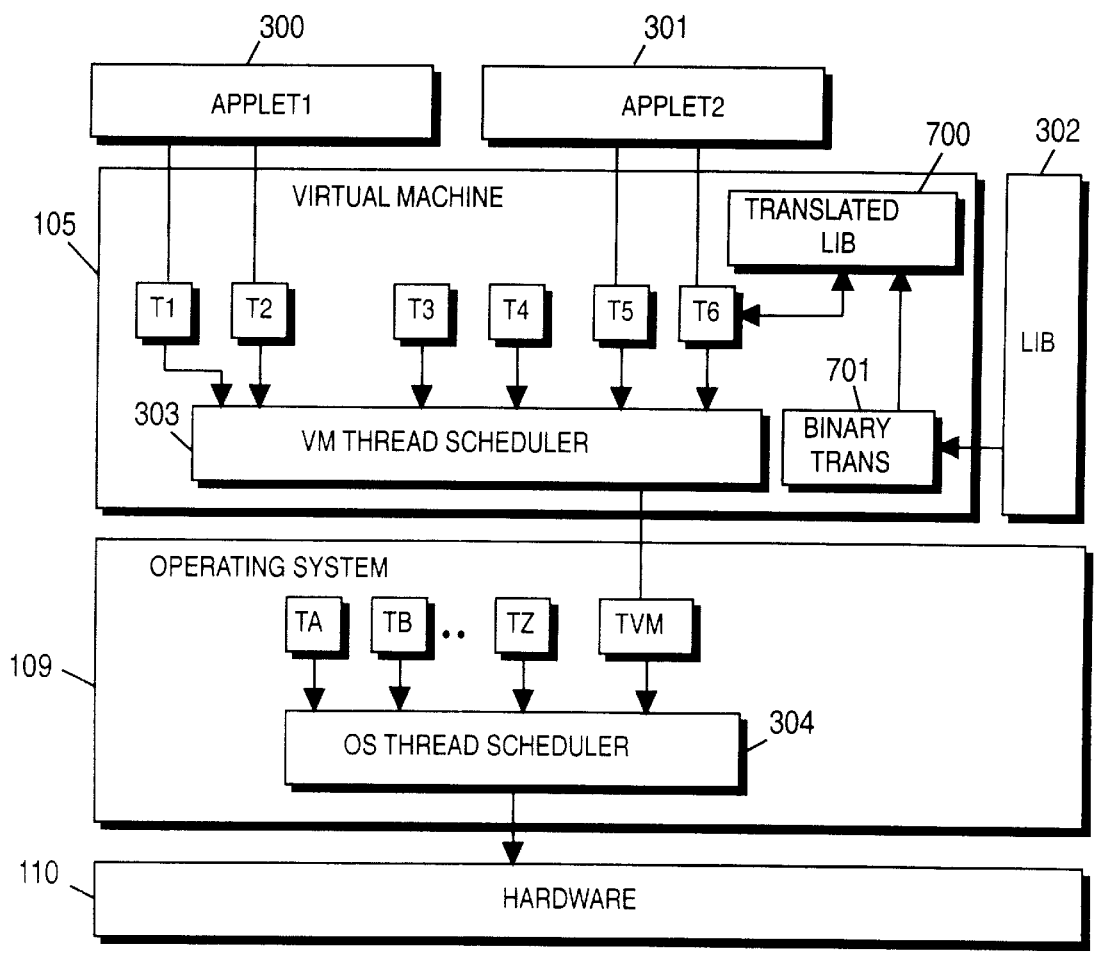
FIG. 7 is a block diagram of a computer system having a virtual machine that implements binary translation of native code in accordance with an embodiment of the invention.

FIG. 7 is a block diagram illustrating a runtime environment implementing binary translation in accordance with an embodiment of the invention. In FIG. 7, operating system 109 runs on top of hardware 110, and virtual machine 105 runs on top of operating system 109. Execution of operating system 109 is supported by hardware 110. As in FIGS. 3A and 3B, virtual machine 105 and operating system 109 comprise VM thread scheduler 303 and OS thread scheduler 304, respectively, for managing thread execution. In addition, virtual machine 105 comprises binary translation process 701.

Executing within virtual machine 105 are multiple applications and/or applets, such as applet1 (300) and applet2 (301). Applet1 and applet2 may each comprise one or more bytecode class files. A linked library file (LIB) 302 is associated with applet2 to support native methods. The native code of library file 302 is parsed and translated by binary translation process 701 of virtual machine 105 to generate translated library 700.

Translated library 700 comprises the intermediate form of the native code, including memory access checks, yields, and non-blocking call variants. When a native method of applet2 is called by thread T6, translated library 700 is interpreted or compiled within virtual machine 105 to execute the desired function. Depending on the intermediate form of translated library 700, the interpreting or compiling process for the translated library may or may not differ from the interpreting or compiling process applied to the classes of applet1 and applet2. However, the general operation of, and control exerted over, the translated library 700 by virtual machine 105 is consistent with that for applet 1 and applet2. In some embodiments, translated library 700 may be processed in thread T6 via frames in stack 212 rather than via native method stack 216. Effectively, translated library 700 may execute as if translated library 700 is providing additional standard methods without the drawbacks of unaltered native code.

Figure 3B:
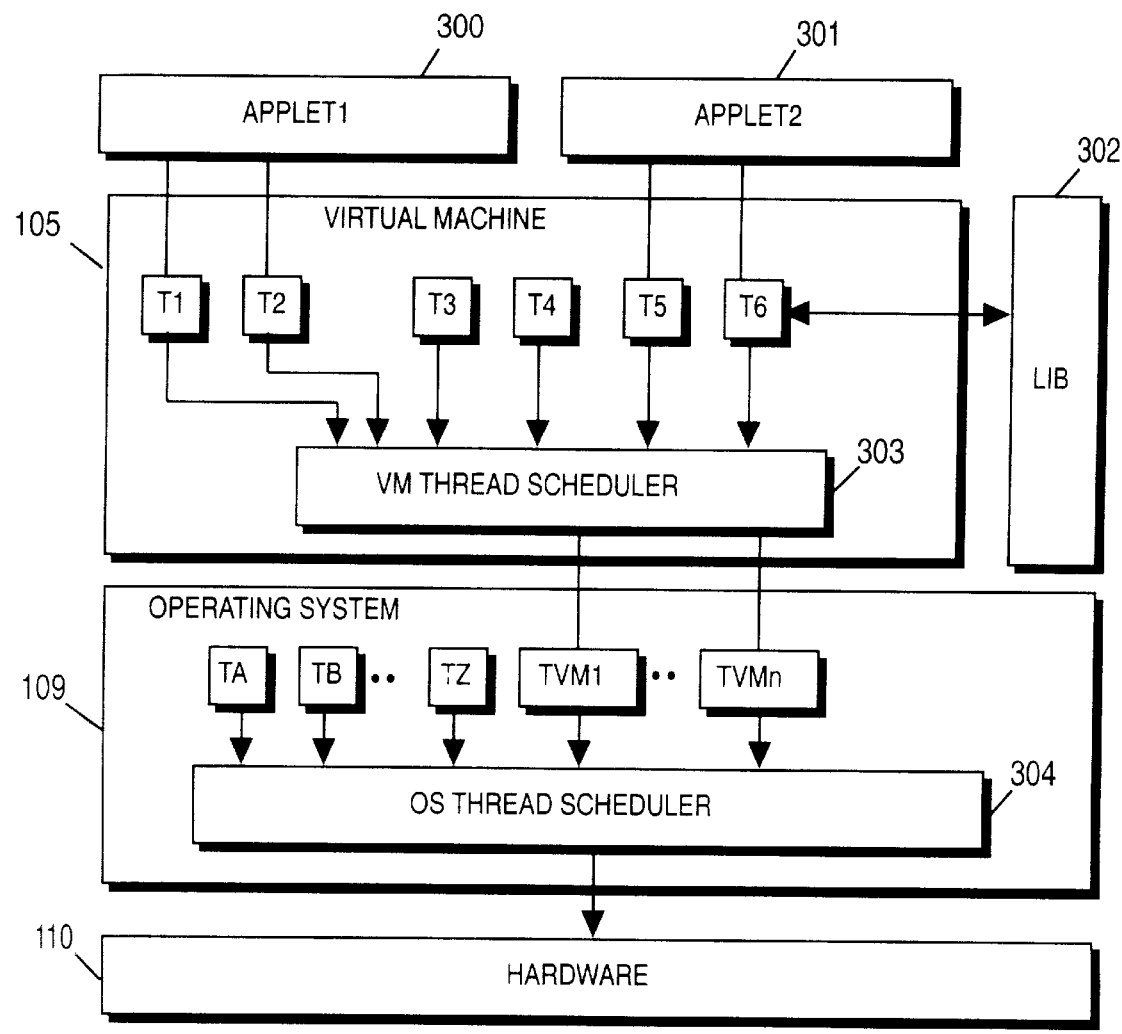
FIG. 3B is a block diagram of a runtime environment having a virtual machine that uses native thread operations.

Because the translated native code functions of the linked library are executed through virtual machine 105 rather than as a separate linked library process carried out through operating system 109, and because blocking calls are not present within translated library 700, cooperative scheduling may be performed by VM thread scheduler 303. Thus, native threading as implemented in FIG. 3B is not necessary. Synchronization of thread events within virtual machine 105 is independent of the underlying operating system and hardware, and debugging may be performed without consideration of operating system-based concurrency issues.

Thus, a method and apparatus of translating and executing native code in a virtual machine environment have been described in conjunction with one or more specific embodiments. The invention is defined by the claims and their full scope of equivalents.

What is claimed is:

1. In a computer system, a method comprising:

obtaining native code from a library;

parsing said native code into an intermediate form;

processing said intermediate form into a translated form that permits cooperative scheduling; and executing said translated form of said native code.

2. The method of claim 1, wherein said method is performed in a virtual machine.

3. The method of claim 2 wherein said executing said translated form further comprises compiling said translated form by said virtual machine.

4. The method of claim 2 wherein said executing said translated form comprises interpreting said translated form by said virtual machine to execute the functions therein.

5. The method of claim 1, wherein said processing comprises:

identifying a blocking system call in said intermediate form; and replacing said blocking system call with a non-blocking variant of said system call.

6. The method of claim 1, wherein said processing comprises:

identifying a memory access operation in said intermediate form; and adding a check for a memory access violation to said memory access operation.

7. The method of claim 1, wherein said processing comprises:

identifying a yield point in said intermediate form; and inserting a yield function at said yield point.

8. The method of claim 7, wherein said yield point comprises a method call.

9. The method of claim 7, wherein said yield point comprises a loop.

10. The method of claim 9, wherein said loop comprises identifying a backward branch.

11. A computer program product comprising:
a computer usable medium having computer readable code embodied therein for translating and executing native code, said computer program product comprising:
computer readable code configured to cause a computer to obtain native code from a library;
computer readable code configured to cause a computer to parse said native code into an intermediate form;
computer readable code configured to cause a computer to process said intermediate form into a translated form that permits cooperative scheduling; and
computer readable code configured to cause a computer to execute said translated form of said native code.

12. The computer program product of claim 11, wherein said computer readable code configured to cause a computer to execute said translated form executes in a virtual machine.

13. The computer program product of claim 11, wherein said computer readable code configured to cause a computer to process said intermediate form comprises:
computer readable code configured to cause a computer to identify a blocking system call in said intermediate form; and
computer readable code configured to cause a computer to replace said blocking system call with a non-blocking variant of said system call.

14. The computer program product of claim 11, wherein said computer readable code configured to cause a computer to process said intermediate form comprises:
computer readable code configured to cause a computer to identify a memory access operation in said intermediate form; and
computer readable code configured to cause a computer to add a check for a memory access violation to said memory access operation.

15. The computer program product of claim 11, wherein said computer readable code configured to cause a computer to process said intermediate form comprises:
computer readable code configured to cause a computer to identify a yield point in said intermediate form; and
computer readable code configured to cause a computer to insert a yield function at said yield point.

16. The computer program product of claim 15, wherein said computer readable code configured to cause a computer to identify said yield point comprises computer readable code configured to cause a computer to identify a method call.

17. The computer program product of claim 15, wherein said computer readable code configured to cause a computer to identify a yield point comprises computer readable code configured to cause a computer to identify a loop.

18. The computer program product of claim 17, wherein said computer readable code configured to cause a computer to identify said loop comprises computer readable code configured to cause a computer to identify a backward branch.

19. An apparatus comprising:
a class comprising a native method, said native method supported by native code in a library;
a virtual machine processing said class, said virtual machine configured to execute said native code in a translated form, said virtual machine comprising:
a thread scheduler implementing cooperative scheduling; and
a translation process configured to transform said native code into an intermediate form, and said intermediate form into said translated form, wherein said translated form is a form suitable for cooperative scheduling.

20. The apparatus of claim 19, wherein said translation process is further configured to replace a blocking system call in said intermediate form with a non-blocking variant of said system call.

21. The apparatus of claim 19, wherein said translation process is further configured to insert a memory access check at a memory access operation in said intermediate form.

22. The apparatus of claim 19, wherein said translation process is further configured to insert a yield operation at a yield point in said intermediate form.

23. The apparatus of claim 22, wherein said yield point is a method call.

24. The apparatus of claim 22, wherein said yield point is a loop.

25. The apparatus of claim 24, wherein said loop is identified by a backward branch.

26. In a computer system, a method for executing native code in a virtual machine comprising:
obtaining native code from a library;
parsing said native code into an intermediate form;
processing said intermediate form to generate a translated form that permits cooperative scheduling; said processing comprising:
replacing blocking system calls in said intermediate form with non-blocking variant of said system calls;
adding checks for memory access violation to memory access operation in said intermediate form;
identifying a yield point in said intermediate form and inserting a yield function at said yield point;
executing said translated form of said native code.

* * * * *